Patented May 9, 1939

2,157,122

UNITED STATES PATENT OFFICE 2,157,122

WARNING SYSTEM FOR INDICATING THE PROXIMITY OF AIRCRAFT

Francis W. Dunmore, Washington, D. C., assignor to the Government of the United States, as represented by the Secretary of Commerce Application May 10, 1937, Serial No. 141,737

10 Claims. (Cl. 250—2)

(Granted under the act of March 3, 1883, as amended April 30, 1928; 370 O. G. 757)

The invention described herein may be manufactured and used by or for the Government of the United States for governmental purposes without the payment to me of any royalty thereon, in accordance with the provisions of the act of April 30, 1928 (ch. 460, 45 Stat. L. 467).

This invention relates to a method and apparatus for the continuous transmission and reception of radio signals on aircraft, which transmitted signals have the same carrier frequency or frequencies for all aircraft and have a modulation characteristic which is a function of the altitude of the aircraft, and a second transmitter or modulation characteristic with a fixed frequency, and which is the same for all aircraft and serves as a warning signal which may be coded to signal the intended direction of deviation (up or down) to be made by the pilot.

With blind flying coming more and more into use with the installation of radio ranges and blind landing equipment, it becomes necessary for a pilot of an aircraft to know when other aircraft are in his immediate vicinity.

The object of my invention is to provide means whereby the pilot of the aircraft is automatically notified of the presence of any other aircraft or aircrafts in the vicinity as well as the altitude at which each of these neighboring aircrafts may be flying. With this information each pilot of an aircraft may signal the other pilots in his immediate vicinity as to any course deviation which he intends to make, so that the other pilots may, if necessary, deviate in the right direction to avoid collision.

Briefly, one arrangement of my invention operates as follows: Each aircraft carries an ultra high radio frequency transmitting and receiving equipment all operating on a fixed frequency of, say, 3.5 meters with about a 20-mile range. The transmitter and receiver are operated alternately at a rapid rate, say, 60, 100 or 800 cycles per second. The ultra high frequency transmitter has two modulators, one modulator controlled by an altimeter and varying anywhere from, say, 570 to 1500 kc. depending upon the altitude of the aircraft, and the other modulator being fixed at, say, 550 kc. The output of the ultra high frequency receiver is connected to a modulation amplifier, the tuning of which is swept rapidly through the range of 570–1500 kc. and the output of which, when a signal is tuned in, operates a light which illuminates a pointer on the tuning dial, thus showing the altitude of the aircraft whose signal is being received. The second modulation amplifier is fixed in tune at 550 kc. and has a signal light on its output and serves as a warning indication that another aircraft is within, say, 20 miles. When his warning lamp comes on, the pilot on each plane notes the altitude of the other plane (from his revolving pointer), and depending upon what he notes he puts a one or two-dot signal on his 550-kc. modulator thus indicating to the other pilot his intention of increasing or decreasing his altitude. In this way each pilot has an understanding as to what the other intends to do (increase or decrease altitude) before he does it.

In another arrangement of my invention two ultra high frequency transmitters and receivers are used. Transmitter A operating on, say, a carrier frequency of 3.2 m. and transmitter B operating on, say, a carrier frequency of 3.5 m. alternately with B at, say, a 100-cycle rate. A is unmodulated except for the 100-cycle switching frequency. B is modulated by any frequency from 570–1500 kc. depending upon the altitude of the aircraft. Receiver C functions when transmitter A is off and B is on. Receiver D functions when transmitter B is off and A is on. Receiver C is tuned to 3.2 meters and gives the warning signal indication. Receiver D is tuned to 3.5 meters with detector for 570–1500 kc. and variable tuned modulation amplifier, whose dial is calibrated in feet altitude. Thus when A is sendng a warning signal receiver C tuned to A's carrier frequency is inoperative while receiver D is operative, but not being tuned to A will not receive A but will receive any 3.5 meter signal from a neighboring aircraft and indicate its altitude. On the next half-cycle of the switching frequency transmitter B will be sending a 3.5 meter signal with an altitude modulation signal. Receiver D becomes inoperative while receiver C becomes operative, but not being tuned to B will not receive B but will receive any 3.2 warning signal from a neighboring aircraft.

Other features of my invention will be apparent from the following detailed description and the accompanying drawings. It is to be expressly understood, however, that these drawings are for the purpose of illustration only and are not designed for a definition of the limits of my invention. Referring to the illustrations—

Figure 1:
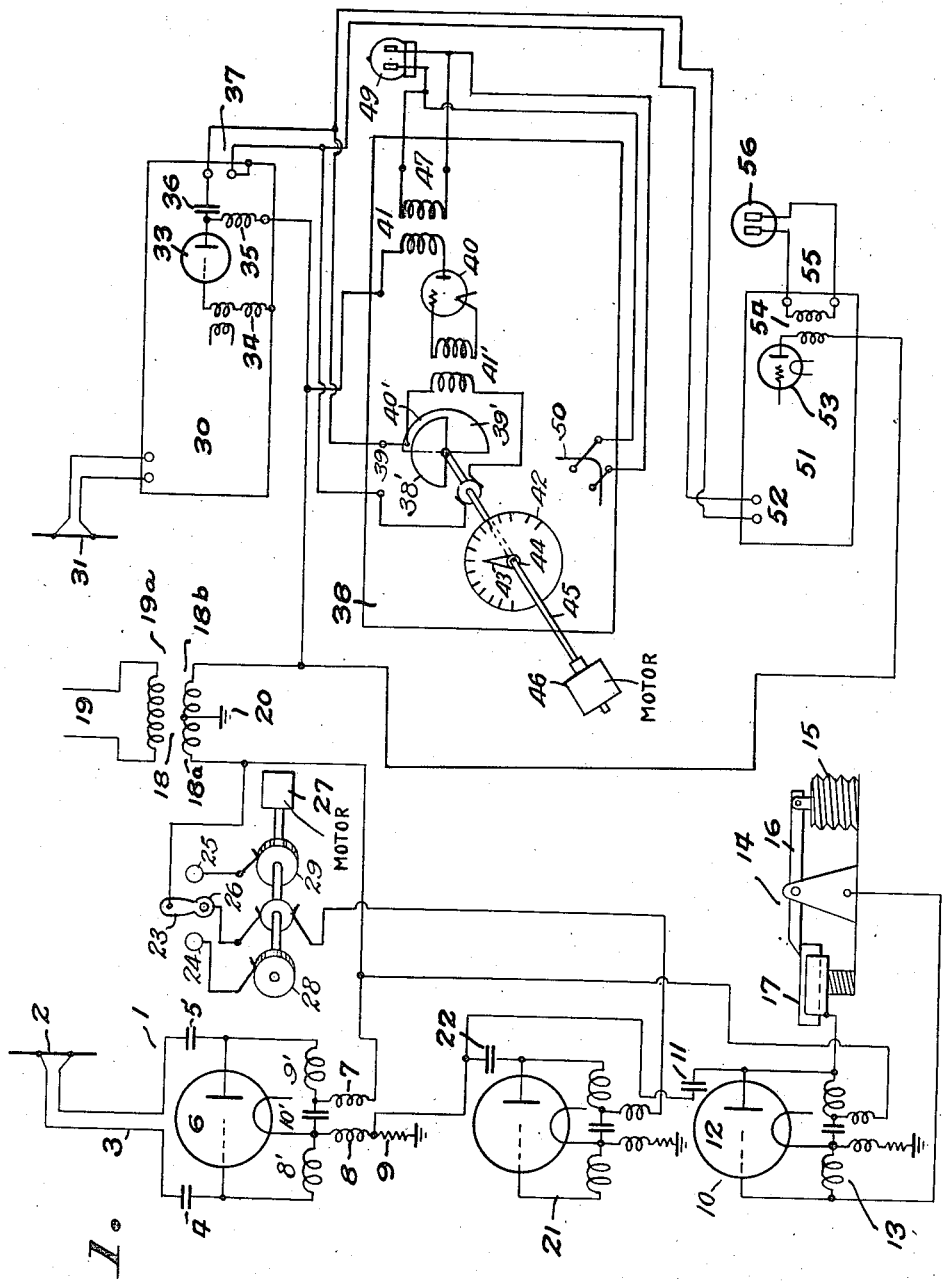
Figure 1 shows a transmitting and receiving arrangement using one carrier frequency.

Referring more in detail to the drawings, Figure 1: 1 represents an ultra high radio frequency transmitter with doublet antenna 2 and transmission line 3 with coupling condensers 4 and 5 and electron tube 6. This tube may operate, say, at 3.5 meters. The plate supply of this tube is supplied through ultra high radio frequency choke 7 which is connected to the side 18a of the secondary 20 of transformer 19a. The coils 8' and 9' with bypass condenser 10' and the interelectrode capacity of tube 6 form the ultra high radio frequency oscillator. The grid circuit of electron tube 6 is biased by the voltage drop across resistor 9. Coil 8 forms a high-impedance path for the ultra high radio frequencies generated by tube 6, and a low-impedance path for the modulation frequencies. The modulation frequency for oscillator 1 is supplied between the choke 8 and the resistor 9 from modulating oscillator circuit 10. The resistor 9 is of such value as to allow some of the modulation frequency from tubes 12 and 21 to be impressed on the grid of tube 6. This circuit consists of electron tube 12, coupling condenser 11, and oscillator coil 13. The frequency of oscillation of this tube is determined by condenser 17 of altimeter unit 14. 17 is operated by a Sylphon element 15 through arm 16. Thus the modulation frequencies impressed upon the carrier wave radiated by tube 1 are proportional to the altitude of the aircraft carrying the apparatus. This modulating frequency range could be, say, 570 to 1500 kilocycles. A second modulator tube 21 impresses through condenser 22 a modulation of fixed frequency on electron tube 1, say, 550 cycles. The plate supply of tube 21 is connected to the side 18a of secondary 20 of transformer 18 as is the plate supply for electron tubes in circuit 1 and 10. A switch 23 is provided in the plate circuit of tube circuit 21 and when thrown on contact 24 commutator 28 transmits a series of single dot signals, and when arm 23 is thrown on contact 25 commutator 29 transmits a series of 2-dot signals. When arm 23 is thrown on contact 26 a steady 550-kilocycle modulation warning signal is impressed on circuit 1. Motor 27 drives the commutators 28 and 29. The primary of transformer 18, as shown at 19, is connected to a switching frequency source which may be any suitable frequency such as 60 cycles, 100 cycles, or 800 cycles. The center of transformer secondary 20 is grounded. The end 18b of the secondary 20 of transformer 19a is not connected to circuits 1, 10 and 21, but is connected to the output tubes in the receiving apparatus. In this way the transmitter and receivers are operated alternately at the switching frequency rate, since when end 18b of secondary 20 becomes positive the receiving apparatus functions and the transmitting apparatus is dead, while when the end 18b becomes negative 18a becomes positive so that the receiving apparatus is dead and the transmitter in operation. 30 is the ultra high frequency radio receiver connected through transmission line 32 to doublet antenna 31. The output tube 33 of this receiver is the detector for the modulation frequencies used in circuits 10 and 21. The grid to ground circuit for tube 33 is through choke 34 which offers a high impedance for these modulation frequencies. The plate of tube 33 contains a similar choke 35 so that the output of tube 33 contains the modulation frequencies which are passed through condenser 36 to output terminals 37 which deliver the modulation frequencies which were impressed on circuit 1, to modulating amplifiers 38 and 51. 38 may be a standard broadcast receiver with a tuning knob 44 which may be rotated continuously through 360° by means of motor 46 and shaft 45. The shaft 45 is also attached to the movable plates 38' of variable condenser 40'. The fixed plates are indicated at 39'. This condenser tunes the input circuit 41' of tube 40 over the band of altitude indicating modulating frequencies. The scale 42 instead of being calibrated in kilocycles may read in terms of altitude. The plate of the output tube 40 is connected as previously mentioned to end 18b of the secondary 20 of transformer 19a. The signal output from 38 is delivered through transformer 41 to terminals 47 which are connected to signal lamp 49, and pointer and scale-illuminating lamp 50. Signal lamps 49 and 50 should be of the neon type or of any other type having an equivalent rate of response. Thus as arm 43 is rotated, when a signal is tuned in, lamp 50 illuminates pointer 43 and scale 42 which indicates at that instant the altitude of the airplane whose signal is being received. Modulating amplifier 51 receives the 550-kc. modulation impressed on transmitter circuit 1 by means of circuit 21. Since this modulation frequency is fixed, amplifier 51 is of the fixed tuned type with output tube 53 whose plate is supplied from the same terminal 18b of secondary 20 of transformer 19a as the other two receivers 30 and 38. The output tube of output 53 of receiver 51 passes through transformer 54 to terminals 55 with signal lamp 56 connected thereto.

In operation this circuit functions as follows: Each time the end 18a of secondary 20 of transformer 19a becomes positive the transmitter circuit 1 functions, sending out a 3.5-meter signal. Circuits 10 and 21 also operate, the former to impress a frequency upon this carrier depending upon the altitude of the airplane A, and the latter to impress a steady frequency of 550 kilocycles. Depending on the height of the airplane A (say 2000 feet) condenser 17 of altitude indicator 14 will set the frequency of circuit 10 to the proper value, say, 1300 kilocycles, which is impressed upon the carrier of circuit 1. Circuit 21 will impress a steady modulation of 550 kilocycles upon the carrier transmitted by circuit 1. During the next half-cycle of the frequency supply at 19, terminal 18a will become negative, thus stopping the operation of circuits 1, 10 and 21, and terminal 18b will become positive thus setting the receiving sets 30, 38 and 51 in operation, that is, in a sensitive condition ready for the reception of any warning signal which might emanate from any aircraft in the immediate vicinity. Should an aircraft B, carrying a similar collision prevention system be, say, within 20 miles, a 3.5-meter signal from aircraft A will be received by its amplifier 30. As A's signal has a modulation of 1300 kilocycles, aircraft B's terminals 37 will supply 1300 kilocycles to its amplifier 38. As arm 43 on aircraft B is rotated, when the point is reached where receiving set 38 becomes tuned to 1300 kilocycles, neon light 50 will flash and illuminate pointer 43 at that position. This position will not read 1300 kilocycles but 2000 feet, on the scale 42, which is the altitude of aircraft A. A 550-kilocycle signal will also be delivered at terminals 37 of aircraft B and its amplifier 51 being tuned to this frequency, will amplify it, thus lighting signal lamp 56. When the pilot on aircraft B sees 56 illuminated he looks at arm 43 and finds the altitude of the neighboring aircraft A to be 2000 feet. As it is about equal to his altitude, which say is 2500 feet, he will close his switch 23 to the position marked "Up", thus sending a 2-dot characteristic on his 550-kilocycle modulation. The pilot on aircraft A seeing it on his lamp 56 will throw his switch 23 to the position marked "Down" thus indicating to the pilot on aircraft B that he is planning to deviate in the opposite direction. In this way each aircraft can signal the other its intended direction of deviation (that is, either up or down) before making such deviation, just as two ships passing at sea signal with their whistles, the intended direction of deviation, i. e., to the starboard or port.

Figure 2:
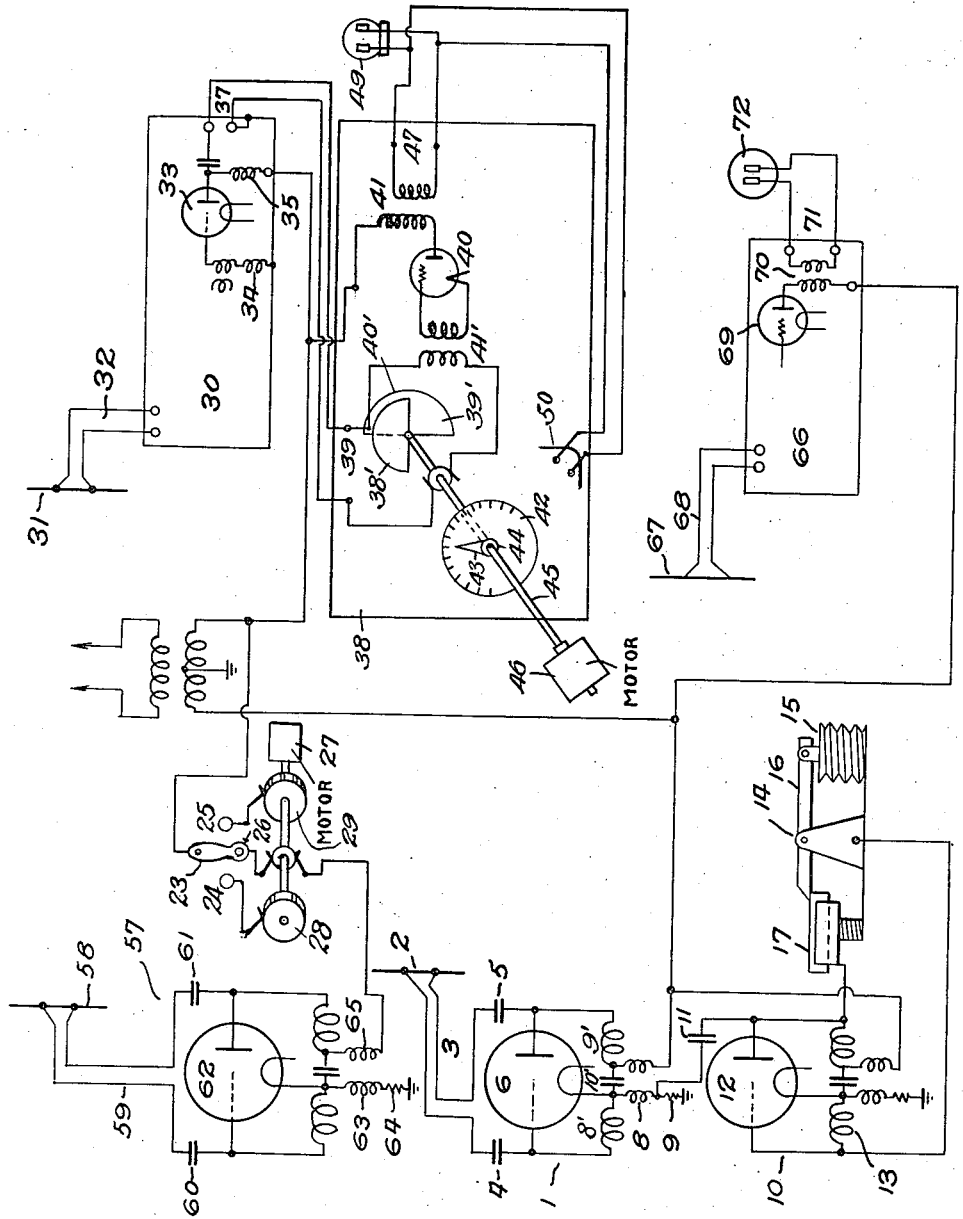
Figure 2 shows a transmitting and receiving arrangement using two carrier frequencies.

Referring now to Figure 2, 1' represents an ultra high radio frequency transmitter with doublet antenna 2' and transmission line 3' with coupling condensers 4' and 5' and electron tube 6'. This tube may operate at, say, 3.5 meters. The plate supply of this tube is supplied through ultra high radio frequency choke 7' which is connected to the side 18a of the secondary 20 of transformer 19a. The grid circuit of electron tube 1' is grounded through ultra high radio frequency choke 8' and resistor 9'. The modulation frequency for oscillator 1 is supplied between the choke 8' and the resistor 9' from modulating oscillator circuit 10'. This circuit consists of electron tube 12', coupling condenser 11', and oscillator coil 13'. The frequency of oscillation of this tube is determined by condenser 17' of altimeter unit 14'. 17' is operated by a Sylphon element 15' through arm 16'. Thus the modulation frequencies impressed upon the carrier wave radiated by tube 1' are proportional to the altitude of the aircraft carrying the apparatus. This modulating frequency range could be, say, 570 to 1500 kilocycles. A second ultra high radio frequency transmitter is shown at 57, with a doublet antenna 58, transmission line 59, with coupling condensers 60 and 61 and electron tube 62. This tube may operate, say, at 3.2 meters. The plate supply with this tube is supplied through ultra high radio frequency choke 65 which is connected to the side 18b of the secondary 20 of transformer 19a. The grid circuit of electron tube 62 is grounded through ultra high radio frequency choke 63 and resistor 64. The modulation frequency for oscillator 57 is produced by the switching frequency supplied at 19. A switch 23 is provided in the plate supply of tube 62 and when thrown on contact 24 and commutator 28 it transmits a series of single dot signals, and when arm 23 is thrown on contact 25 commutator 29 transmits a series of two-dot signals. When arm 23 is thrown on contact 26 a steady 3.2-meter warning signal is sent out by circuit 57. Motor 27 drives commutators 28 and 29. The primary of transformer 19a is shown at 19 connected to a switching frequency source which may be any suitable source, such as 60, 100 or 800 cycles. The center of transformer secondary 20 is grounded. The secondary terminal 18b of secondary 18 is connected to the output tube of ultra high radio frequency receiver 30'. This receiver is tuned to 3.5 meters. It consists of receiving doublet 31' and input transmission line 32'. The output tube 33' has in its grid-to-ground circuit a choke 34' which offers a high impedance to the modulation frequencies transmitted by transmitter 1'. A similar choke 35' is in the output plate circuit. The detected modulation frequencies pass through condenser 36' to output terminals 37' and thence to the input terminals 39 of a standard broadcast receiver. This receiver has a tuning knob 44 which may be rotated continuously through 360° by means of motor 46 and shaft 45.

The scale 42 instead of being calibrated in kilocycles may read in terms of altitude. The plate of the output tube 40 is connected to end 18b of the secondary 20 of transformer 19a. The signal output from 38 is delivered through transformer 41 to terminals 47 which are connected to headphones 48, signal lamp 49, and pointer and scale illuminating lamp 50. Thus as arm 46 is rotated, when a signal is tuned in, lamp 50 illuminates pointer 43 and scale 42, which indicates at that instant the altitude of the airplane whose signal is being received.

66 is an ultra high radio frequency receiver for reception of the 3.2-meter warning signal. It consists of a receiving doublet 67 and transmission line 68. The output tube 69 in this receiver is connected to the end 18a of the secondary 18 of transformer 19a. The output of tube 69 passes through transformer 70 to output terminals 71 which are connected to warning signal lamp 72.

In operation this circuit functions as follows: When the secondary terminal 18a of transformer 19a becomes positive, transmitting circuit 1' and receiving circuit 66 is put into operation, while transmitting circuit 57 and receiving circuits 30' and 38 are rendered inoperative. During this half-cycle, therefore, of the frequency supplied at 19 the aircraft is transmitting an ultra high radio frequency carrier of 3.5 meters modulated by some frequency between 570 and 1500 kilocycles, depending upon the setting of condenser 17, that is, the altitude of the aircraft. At the same time receiver 66 is ready to receive a warning signal on 3.2 meters from any aircraft within a range of 20 miles. On the next half-cycle of the frequency supplied at 19 transmitter 1' and receiver 66 are rendered inoperative while transmitter 57 and receivers 30' and 38 become operative. This results in the transmission from the aircraft of a warning signal on 3.2 meters and the reception of an altitude indicating signal from some neighboring aircraft if that aircraft is within 20 miles. This altitude signal is received on receiver 30' and consists of the modulated ultra high radio frequency signal from a neighboring aircraft carrying transmitting and receiving apparatus like that shown in Fig. 2, the modulation frequency being a function of the altitude of the aircraft carrying the apparatus. The altitude of the neighboring aircraft is read on scale 42. Although transmitter 1' and receiver 66 are operating simultaneously, there is no interference since they are functioning on different frequencies. This is also true of transmitter 57 and receiver 30'. The pilot uses the switch 23 in a manner to signal his intended direction of deviation as has been previously described.

While I have shown a method of rendering receiving sets operative and inoperative by means of changing the plate voltage of the output tube from plus to minus at the switching frequency rate, it is understood that other methods may be used, such for example as putting the switching frequency on the plate of the heterodyne oscillator tube in case a superheterodyne type of receiver is used.

What I claim is:

1. On an aircraft a radiant energy transmitter operating on a certain carrier frequency and having a first and second modulating oscillator, said first modulating oscillator operating at a fixed frequency to provide a warning signal, the frequency of said second modulating oscillator being controlled by an altitude indicating means over a band of frequencies not including said fixed frequency for giving altitude indicating signals, receiving means tuned to the same carrier frequency as that of said radiant energy transmitter, and having detecting means with output circuit for deriving the modulation frequencies, an amplifying means for said fixed frequency having input and output circuits and with input circuit connected to the output circuit of said detecting means and output circuit connected to a visual warning indicating means, a second amplifying means for said band of frequencies with input and output circuits, said second amplifying means for said altitude indicating signals having a continuously operated variable tuning means with attached pointer, the input of said second amplifying means being connected to the output of said detecting means and the output energizing an illuminating means for said pointer, electrical cyclic switching means associated with said radiant energy transmitter and its associated modulating oscillators and with said receiving and modulating amplifier means, so that said receiving and amplifying means operate without interference from said radiant energy transmitting means.

2. In a system for collision prevention, a plurality of aircraft equipped as set forth in claim 1 with radiant energy transmitters operating on the same carrier frequency whereby a pilot on any one of said aircraft is continuously warned of the proximity and altitude of other of said aircraft.

3. On an aircraft a radiant energy transmitter operating on a certain carrier frequency and having a first and second modulating oscillator with keying means associated with said first modulator, said first modulator operating at a fixed frequency to provide course deviation signals when coded, the frequency of said second modulating oscillator being controlled by an altitude indicating means over a band of frequencies not including said fixed frequency for giving altitude indicating signals, receiving means tuned to the same carrier frequency as that of said radiant energy transmitter and having detecting means with output circuit for deriving the modulating frequencies, an amplifying means for said fixed frequency having an input and output circuit and with input circuit connect to the output circuit of said detecting means, an output circuit connected to a visual indicating means for the coded course deviation signals, a second amplifying means for said band of frequencies with input and output circuits, said second amplifying means for said altitude indicating signals having a continuously operated variable tuning means with attached pointer, the input of said second amplifying means being connected to the output of said detecting means the output energizing an illuminating means for said pointer; electrical cyclic switching means associated with said radiant energy transmitter and its associated modulating oscillators and with said receiving and modulating amplifier means so that said receiving and amplifying means operate without interference from said radiant energy transmitting means.

4. In a system for collision prevention, a plurality of aircraft equipped as set forth in claim 3 with radiant energy transmitters operating on the same carrier frequency whereby a pilot on any of said aircraft is continuously informed of the altitude of other of said aircraft while sending a coded course deviation signal to other of said aircraft.

5. In a system of collision prevention, a plurality of aircraft equipped as set forth in claim 3 with radiant energy transmitters operating on the same carrier frequency whereby a pilot on any one of said aircraft is continuously informed of the altitude of other of said aircraft while receiving a coded course deviation signal from other of said aircraft.

6. On an aircraft a first radiant energy transmitter for providing warning signals, a second radiant energy transmitter operating on a different frequency than said first radiant energy transmitter and having a modulating oscillator controlled by an altitude indicating means over a band of frequencies for giving altitude indicating signals, receiving means tuned to the same carrier frequency as that of said first radiant energy transmitter and having detecting means with output circuit connected to a visual warning indicating means, a second receiving means tuned to the carrier frequency of said second radiant energy transmitter with detecting means for said band of modulation frequencies, an amplifying means with input and output circuits with input circuit connected to the output of said detecting means, said amplifying means for said altitude indicating signals having a continuously operated variable tuning means with attached pointer, the output of said amplifying means energizing an illuminating means for said pointer, an electrical cyclic switching means associated with said first and said second radiant energy transmitting means and said modulating oscillator means and with said first and said second receiving means and said modulating amplifier means so that said second receiving means and said modulating amplifier means operate without interference from said second radiant energy transmitting means, and said first receiving means operates without interferences from said first radiant energy transmitting means.

7. In a system for collision prevention, a plurality of aircraft equipped as set forth in claim 6 with radiant energy transmitters operating on the same two carrier frequencies whereby a pilot on any one of said aircraft is continuously warned of the proximity and altitude of other of said aircraft.

8. On an aircraft a first radiant energy transmitter with keying means for providing course deviation signals, a second radiant energy transmitter operating on a difference frequency than said first radiant energy transmitter and having a modulating oscillator controlled by an altitude indicating means over a band of frequencies for giving altitude indicating signals, receiving means tuned to the same carrier frequency as that of said first radiant energy transmitter and having detecting means with output circuit connected to a visual course deviation code indicating means, a second receiving means tuned to the carrier frequency of said second radiant energy transmitter with detecting means for said band of modulation frequencies, an amplifying means with input and output circuits, with input circuit connected to the output of said detecting means, said amplifying means for said altitude indicating signals having a continuously variable tuning means with attached pointer, the output of said amplifying means energizing an illuminating means for said pointer, an electrical cyclic switching means associated with said first and said second radiant energy transmitting means and said modulating oscillator means and with said first and said second receiving means and said modulating amplifier means, so that said second receiving means and said modulating amplifier means operate without interference from said second radiant energy transmitting means, and said first receiving means operates without interference from said first radiant energy transmitting means.

9. In a system for collision prevention, a plurality of aircraft equipment as set forth in claim 8 with radiant energy transmitters operating on the same two carrier frequencies whereby a pilot on any one of said aircraft is continuously informed of the altitude of other of said aircraft while sending a coded course deviation signal to other of said aircraft.

10. In a system for collision prevention, a plurality of aircraft equipment as set forth in claim 8 with radiant energy transmitters operating on the same two carrier frequencies whereby a pilot on any one of said aircraft is continuously informed of the altitude of other of said aircraft while receiving a coded course deviation signal from other of said aircraft.

FRANCIS W. DUNMORE.